Patented May 6, 1930

1,757,902

UNITED STATES PATENT OFFICE

RENÉ DALOZE, OF UCCLE, BELGIUM

MANUFACTURE OF PURE LEAD HYDROXIDE STARTING FROM IMPURE SULPHATE OF LEAD

No Drawing. Application filed November 8, 1926, Serial No. 147,198, and in France October 12, 1926.

The applicant has described in a copending application a process for the manufacture of pure carbonate of lead starting from an impure sulphate of lead, in which a double decomposition is effected between the sulphate of lead and an excess of an acetate of an alkali earth metal in solution. The solution obtained, after separation from the insoluble matters comprising the insoluble sulphate of alkali earth metal produced by this double decomposition, was treated with a base in order to decompose partially the neutral acetate of lead in solution and to form tribasic acetate of lead in solution which was decomposed by carbonic acid in order to precipitate carbonate of lead.

According to the present invention, the solution separated from the insoluble matters comprising sulphate of alkali earth metal, is treated with a base in a quantity sufficient to decompose completely the neutral acetate of lead in solution. In this way, tribasic acetate of lead in solution is no longer obtained; on the contrary this acetate which may be formed during the addition of the base, is itself decomposed during the process, lead hydroxide Pb (OH)$_2$ being precipitated.

As an example, for an equivalent of sulphate of lead contained in the raw material (for instance sediment of lead chambers previously washed in order to eliminate soluble iron, and neutralized), such a quantity of an aqueous solution of acetate of calcium (for instance of 24%) is used that it shall contain more than an equivalent of calcium acetate. In the known manner, an excess of the latter prevents the reaction of dissolution from being reversible.

This reaction is as follows:

(I) 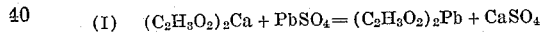

After filtration of the insoluble calcium sulphate, the clear solution obtained, containing neutral acetate of lead, is mixed with an equivalent of calcium hydroxide. The complete reaction may be represented as follows:

(II) 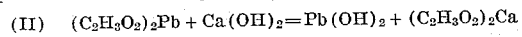

In this reaction of the precipitation of lead hydroxide, the molecule of calcium acetate of the initial solution is regenerated.

The lead hydroxide precipitated is separated by filtration, and the resulting regenerated solution of acetate of calcium can be utilized in a new operation for dissolving raw sulphate of lead.

The reaction (II) of precipitation of lead hydroxide could also be carried out in two stages, though this does not offer any immediate advantage for carrying out the process. Thus for instance the solution of neutral acetate of lead, separated from the insoluble matter, could be first treated with a quantity of alkali earth metal base just or approximately sufficient for the purpose of forming tribasic acetate of lead in solution, in accordance with the equation:

(III) 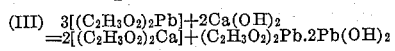

Whereupon the solution of neutral acetate of lead and of tribasic acetate of lead thus obtained, would be treated with the quantity of alkali earth metal base required for decomposing the soluble tribasic acetate of lead formed in solution as an intermediate compound. This decomposition then takes place in accordance with the equation:

(IV) 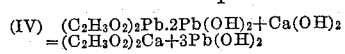

and the final result will be identical with that of the example already described, the solution of acetate of lead separated from the insoluble alkali earth sulphate being in the last analysis always completely decomposed in order to precipitate lead hydroxide.

The importance of the process described is that pure lead hydroxide when roasted in the air, gives minimum directly, whilst carbonate of lead under the same conditions, gives red lead or minimum. Lead hydroxide could besides also give, like carbonate of lead, massicot or litharge.

Having thus described my invention, what I claim and desire to secure by Letters Patent is:—

1. A process for the manufacture of pure lead hydroxide starting with impure sulphate of lead comprising, effecting a double decomposition between the sulphate of lead and an excess of alkali-earth metal acetate in solution, said alkali-earth metal acetate being such as to give an insoluble sulphate, separating the stable solution containing lead from the insoluble matters comprising the alkali-earth metal sulphate, and decomposing with an alkali-earth metal base the neutral lead acetate in said stable solution to precipitate lead hydroxide.

2. A process according to claim 1 in which the proportion of two molecular weights of alkali-earth metal base is combined with three molecular weights of lead acetate to form one molecular weight of tri-basic lead acetate and then combining with the latter a supplementary equivalent part of the base so as to form three parts of lead hydroxide.

3. A process for obtaining pure lead hydroxide from impure lead sulphate which comprises adding to the sulphate an excess of calcium acetate in solution; filtering the same; then adding lime to the solution of lead acetate in the proportion of two molecular weights of lime to three molecular weights of lead acetate; then adding to the tri-basic lead acetate formed, one molecular weight of lime, to thereby form a pure precipitate of lead hydroxide.

In testimony whereof I affix my signature.

RENÉ DALOZE.